US008938236B2

(12) United States Patent
Uno et al.

(10) Patent No.: US 8,938,236 B2
(45) Date of Patent: Jan. 20, 2015

(54) MOBILE DEVICE REDIRECTING TECHNOLOGY

(75) Inventors: Nobukazu Uno, Tokyo (JP); Masashi Kanauchi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 172 days.

(21) Appl. No.: 13/520,755

(22) PCT Filed: Dec. 14, 2010

(86) PCT No.: PCT/JP2010/072499
§ 371 (c)(1),
(2), (4) Date: Aug. 2, 2012

(87) PCT Pub. No.: WO2011/083663
PCT Pub. Date: Jul. 14, 2011

(65) Prior Publication Data
US 2012/0289230 A1 Nov. 15, 2012

(30) Foreign Application Priority Data
Jan. 8, 2010 (JP) .................................. 2010-002719

(51) Int. Cl.
*H04W 4/00* (2009.01)
*H04W 40/00* (2009.01)

(52) U.S. Cl.
USPC ...................... 455/435.2; 455/432.1; 455/445; 370/331; 370/338

(58) Field of Classification Search
CPC ............ H04W 36/00; H04W 4/00; H04Q 7/20
USPC .......................... 455/432.1–445; 370/331, 338
See application file for complete search history.

(56) References Cited

U.S. PATENT DOCUMENTS

| 6,078,805 | A  | * | 6/2000 | Scott ............................. 455/406 |
| 6,597,910 | B1 | * | 7/2003 | Ra ................................. 455/433 |
| 6,600,917 | B1 | * | 7/2003 | Maupin ....................... 455/414.1 |

(Continued)

OTHER PUBLICATIONS

3GPP TS 25.331 V8.8.0, Sep. 2009, "3rd Generation Partnership Project; Technical Specification Group Radio Access Network; Radio Resource Control (RRC); Protocol Specification (Release 8);" 1,697 pages.

(Continued)

*Primary Examiner* — Wesley Kim
(74) *Attorney, Agent, or Firm* — Osha Liang LLP

(57) ABSTRACT

Even when the mobile terminal (UE) redirected from the UMTS cell to the LTE cell by the redirecting technology cannot start the communication with the LTE system, the communication with the UMTS system can be started. A mobile terminal (UE) according to the present invention is instructed to be redirected from a UMTS cell to an LTE cell by a radio control apparatus (RNC), in an overlapped area between the UMTS cell in which communication with a UMTS system is available and the LTE cell in which communication with an LTE system is available, by transmitting a connection request signal including an LTE supported identifier for indicating that the LTE system is supported to the radio control apparatus (RNC) of the UMTS system. Moreover, the mobile terminal (UE) includes a connection setting process unit which executes a connection setting process with the radio control apparatus (RNC) while being turned into a state of not supporting the LTE system, when receiving a location registration failure signal for indicating that location registration to the tracking area of the LTE system is ended in failure.

10 Claims, 11 Drawing Sheets

(56) References Cited

U.S. PATENT DOCUMENTS

| | | | |
|---|---|---|---|
| 8,532,026 B2* | 9/2013 | Osborn | 370/328 |
| 8,615,230 B2* | 12/2013 | Wu | 455/424 |
| 8,634,829 B2* | 1/2014 | Palviainen | 455/433 |
| 2003/0108027 A1* | 6/2003 | Kim et al. | 370/345 |
| 2004/0203863 A1* | 10/2004 | Huomo | 455/456.1 |
| 2005/0213566 A1* | 9/2005 | Jutila et al. | 370/352 |
| 2006/0114871 A1* | 6/2006 | Buckley et al. | 370/338 |
| 2006/0116125 A1* | 6/2006 | Buckley et al. | 455/435.1 |
| 2006/0166699 A1* | 7/2006 | Aghvami et al. | 455/552.1 |
| 2006/0178144 A1* | 8/2006 | Kuroda | 455/432.1 |
| 2006/0256749 A1* | 11/2006 | Rexhepi et al. | 370/329 |
| 2007/0037577 A1* | 2/2007 | Dalsgaard et al. | 455/436 |
| 2007/0049269 A1* | 3/2007 | Ophir et al. | 455/432.1 |
| 2007/0066270 A1* | 3/2007 | Dantu et al. | 455/331 |
| 2008/0043674 A1* | 2/2008 | Suh et al. | 370/331 |
| 2008/0176563 A1* | 7/2008 | Lee et al. | 455/435.2 |
| 2008/0233959 A1* | 9/2008 | Klatt | 455/436 |
| 2008/0304458 A1* | 12/2008 | Aghvami et al. | 370/338 |
| 2009/0131051 A1* | 5/2009 | Zhang et al. | 455/435.1 |
| 2009/0312015 A1* | 12/2009 | Jessen et al. | 455/432.1 |
| 2009/0318116 A1* | 12/2009 | Kim | 455/411 |
| 2010/0009678 A1* | 1/2010 | Munoz Munoz et al. | 455/433 |
| 2010/0014484 A1* | 1/2010 | Sudo et al. | 370/331 |
| 2010/0056160 A1* | 3/2010 | Kim et al. | 455/444 |
| 2010/0062798 A1* | 3/2010 | Poe et al. | 455/509 |
| 2010/0144366 A1* | 6/2010 | Ishii et al. | 455/456.1 |
| 2010/0159919 A1* | 6/2010 | Wu | 455/424 |
| 2010/0240361 A1* | 9/2010 | Jiang | 455/426.1 |
| 2010/0255836 A1* | 10/2010 | Chen | 455/426.1 |
| 2010/0317352 A1* | 12/2010 | Nakata | 455/445 |
| 2011/0080825 A1* | 4/2011 | Dimou et al. | 370/216 |
| 2011/0116453 A1* | 5/2011 | Huang et al. | 370/329 |
| 2011/0130142 A1* | 6/2011 | Hsu et al. | 455/436 |
| 2012/0269162 A1* | 10/2012 | Vesterinen et al. | 370/331 |
| 2013/0059579 A1* | 3/2013 | Uno et al. | 455/434 |

OTHER PUBLICATIONS

Translation of International Search Report issued in PCT/JP2010/072499, dated Feb. 22, 2011, 2 pages.

* cited by examiner

RRC CONNECTION REQUEST (REL-8)

| Information Element/Group name | Need | Version |
|---|---|---|
| Message Type | MP | |
| Radio Bearer IEs | | |
| Predefined configuration status information | MP | REL-5 |
| UE information elements | | |
| Initial UE identity | MP | |
| Establishment cause | MP | |
| Protocol error indicator | MD | |
| >UE Specific Behaviour Information 1 idle | OP | |
| Domain indicator | MP | REL-6 |
| Call type | CV-CS-Domain | REL-6 |
| UE capability indication | OP | REL-6 |
| MBMS Selected Services | OP | REL-6 |
| UE Mobility State Indicator | MD | REL-7 |
| Support for F-DPCH | OP | REL-6 |
| Support for Enhanced F-DPCH | OP | REL-7 |
| HS-PDSCH in CELL_FACH | OP | REL-7 |
| MAC-ehs support | OP | REL-7 |
| DPCCH Discontinuous Transmission support | OP | REL-7 |
| Support of common E-DCH | OP | REL-8 |
| Multi cell support | OP | REL-8 |
| Pre-redirection info | OP | REL-8 |
| Support of MAC-i/is | OP | REL-8 |
| Support of SPS operation | OP | REL-8 |
| Support for CS Voice over HSPA | OP | REL-8 |
| Measurement information elements | | |
| Measured results on RACH | OP | |
| Access stratum release indicator | MP | REL-4~8 |

FIG. 3

RRC CONNECTION REQUEST (REL-7)

| Information Element/Group name | Need | Version |
|---|---|---|
| Message Type | MP | |
| Radio Bearer IEs | | |
| Predefined configuration status information | MP | REL-5 |
| UE information elements | | |
| Initial UE identity | MP | |
| Establishment cause | MP | |
| Protocol error indicator | MD | |
| >UE Specific Behaviour Information 1 idle | OP | |
| Domain indicator | MP | REL-6 |
| Call type | CV-CS-Domain | REL-6 |
| UE capability indication | OP | REL-6 |
| MBMS Selected Services | OP | REL-6 |
| UE Mobility State Indicator | MD | REL-7 |
| Support for F-DPCH | OP | REL-6 |
| Support for Enhanced F-DPCH | OP | REL-7 |
| HS-PDSCH in CELL_FACH | OP | REL-7 |
| MAC-ehs support | OP | REL-7 |
| DPCCH Discontinuous Transmission support | OP | REL-7 |
| Measurement information elements | | |
| Measured results on RACH | OP | |
| Access stratum release indicator | MP | REL-4 |

FIG. 4

(a) RRC CONNECTION SETUP COMPETE (REL-8)

| Information Element/Group name | Need | Version |
|---|---|---|
| Message Type | MP | |
| UE information elements | | |
| RRC transaction identifier | MP | |
| START list | MP | |
| >CN domain identity | MP | |
| >START | MP | |
| UE radio access capability | OP | |
| UE radio access capability extension | OP | |
| Other information elements | | |
| UE system specific capability | OP | |
| >Inter-RAT UE radio access capability | MP | |
| Deferred measurement control reading | MD | REL-7 |

(c) UE multi-mode/multi-RAT capability (REL-8)

| Information Element/Group name | Need | Version |
|---|---|---|
| Multi-RAT capability | MP | |
| Support of GSM | MP | |
| Support of multi-carrier | MP | |
| Multi-mode capability | MP | |
| Support of UTRAN to GERAN NACC | CV- | REL-5 |
| Support of Handover to GAN | CV- | REL-6 |
| Support of Inter-RAT PS handover | CV- | REL-6 |
| Support of PS Handover to GAN | CV- | REL-7 |
| Support of E-UTRA FDD | CV- | REL-8 |
| Support of Inter-RAT PS Handover to E-UTRA FDD | CV- | REL-8 |
| Support of E-UTRA TDD | CV- | REL-8 |
| Support of Inter-RAT PS Handover to E-UTRA TDD | CV- | REL-8 |
| EUTRA Feature Group Indicators | CV- | REL-8 |

(b) UE radio access capability (REL-8)

| Information Element/Group name | Need | Version |
|---|---|---|
| Access stratum release indicator | MP | |
| DL capability with simultaneous HS-DSCH configuration | CV- | REL-5 |
| PDCP capability | MP | |
| RLC capability | MP | |
| Transport channel capability | MP | |
| RF capability FDD | OP | |
| RF capability TDD | OP | REL-4 |
| RF capability TDD 1.28 Mcps | CV- | REL-4 |
| Physical channel capability | MP | |
| UE multi-mode/multi-RAT capability | MP | |
| Security capability | MP | |
| UE positioning capability | MP | |
| Measurement capability | OP | |
| Measurement capability TDD | OP | REL-8 |
| Device type | MD | REL-6 |
| Support for System Information Block type 11bis | OP | REL-6,7 |
| Support for F-DPCH | OP | REL-6 |
| MAC-ehs support | OP | REL-7 |
| UE specific capability Information LCR TDD | OP | REL-7 |
| Support for E-DPCCH Power Boosting | OP | REL-7 |
| Support of common E-DCH | CV- | REL-8 |
| Support of MAC-i/is | CV- | REL-8 |
| Support of SPS operation | CV- | REL-8 |
| Support of Control Channel DRX operation | CV- | REL-8 |
| Support of CSG | OP | REL-8 |
| Support for Two DRX schemes in URA_PCH and CELL_PCH | OP | REL-7 |
| Support for E-DPDCH power interpolation formula | OP | REL-7 |
| Support for absolute priority based cell re-selection in UTRAN | OP | REL-8 |

FIG. 5

(a) RRC CONNECTION SETUP COMPETE (REL-7)

| Information Element/Group name | Need | Version |
|---|---|---|
| Message Type | MP | |
| UE information elements | | |
| RRC transaction identifier | MP | |
| START list | MP | |
| >CN domain identity | MP | |
| >START | MP | |
| UE radio access capability | OP | |
| UE radio access capability extension | OP | |
| Other information elements | | |
| UE system specific capability | OP | |
| >Inter-RAT UE radio access capability | MP | |
| Deferred measurement control reading | MD | REL-7 |

(b) UE radio access capability (REL-7)

| Information Element/Group name | Need | Version |
|---|---|---|
| Access stratum release indicator | MP | |
| DL capability with simultaneous HS-DSCH configuration | CV- | REL-5 |
| PDCP capability | MP | |
| RLC capability | MP | |
| Transport channel capability | MP | |
| RF capability FDD | OP | |
| RF capability TDD | OP | REL-4 |
| RF capability TDD 1.28 Mcps | CV- | REL-4 |
| Physical channel capability | MP | |
| UE multi-mode/multi-RAT capability | MP | |
| Security capability | MP | |
| UE positioning capability | MP | |
| Measurement capability | OP | |
| Device type | MD | REL-6 |
| Support for System Information Block type 11bis | OP | REL-6,7 |
| Support for F-DPCH | OP | REL-6 |
| MAC-ehs support | OP | REL-7 |
| UE specific capability Information LCR TDD | OP | REL-7 |
| Support for E-DPCCH Power Boosting | OP | REL-7 |
| Support for Two DRX schemes in URA_PCH and CELL_PCH | OP | REL-7 |
| Support for E-DPDCH power interpolation formula | OP | REL-7 |

(c) UE multi-mode/multi-RAT capability (REL-7)

| Information Element/Group name | Need | Version |
|---|---|---|
| Multi-RAT capability | MP | |
| Support of GSM | MP | |
| Support of multi-carrier | MP | |
| Multi-mode capability | MP | |
| Support of UTRAN to GERAN NACC | CV- | REL-5 |
| Support of Handover to GAN | CV- | REL-6 |
| Support of Inter-RAT PS handover | CV- | REL-6 |
| Support of PS Handover to GAN | CV- | REL-7 |

FIG. 6

(a) ATTACH REQUEST (REL-8)

| Information Element | Presence |
| --- | --- |
| Protocol discriminator | M |
| Skip indicator | M |
| Attach request message identity | M |
| MS network capability | M |
| Attach type | M |
| GPRS ciphering key sequence number | M |
| DRX parameter | M |
| P-TMSI or IMSI | M |
| Old routing area identification | M |
| MS Radio Access capability | M |
| Old P-TMSI signature | O |
| Requested READY timer value | O |
| TMSI status | O |
| PS LCS Capability | O |
| Mobile station classmark 2 | O |
| Mobile station classmark 3 | O |
| Supported Codecs | O |
| UE network capability | O |
| Additional mobile identity | O |
| Additional old routing area identification | O |

(b) ROUTING AREA UPDATE REQUEST (REL-8)

| Information Element | Presence |
| --- | --- |
| Protocol discriminator | M |
| Skip indicator | M |
| Routing area update request message identity | M |
| Update type | M |
| GPRS ciphering key sequence number | M |
| Old routing area identification | M |
| MS Radio Access capability | M |
| Old P-TMSI signature | O |
| Requested READY timer value | O |
| DRX parameter | O |
| TMSI status | O |
| P-TMSI | O |
| MS network capability | O |
| PDP context status | O |
| PS LCS Capability | O |
| MBMS context status | O |
| UE network capability | O |
| Additional mobile identity | O |
| Additional old routing area identification | O |
| Mobile station classmark 2 | O |
| Mobile station classmark 3 | O |
| Supported Codecs | O |

(c) MS network capability (REL-8)

<MS network capability value part> ::=
  <GEA1 bits>
  <SM capabilities via dedicated channels: bit>
  <SM capabilities via GPRS channels: bit>
  <UCS2 support: bit>
  <SS Screening Indicator: bit string(2)>
  <SoLSA Capability : bit>
  <Revision level indicator: bit>
  <PFC feature mode: bit>
  <Extended GEA bits>
  <LCS VA capability: bit>
  <PS inter-RAT HO to UTRAN Iu mode capability: bit>
  <PS inter-RAT HO to E-UTRAN S1 mode capability: bit>
  <CSFB Capability: bit>
  <ISR support: bit>
  <SRVCC to GERAN/UTRAN capability: bit>
  <EPC capability: bit>
  <Spare bits>;
  ...

LTE SUPPORT ASSOCIATED INFORMATION

FIG. 7

(a) ATTACH REQUEST (REL-7)

| Information Element | Presence |
|---|---|
| Protocol discriminator | M |
| Skip indicator | M |
| Attach request message identity | M |
| MS network capability | M |
| Attach type | M |
| GPRS ciphering key sequence number | M |
| DRX parameter | M |
| P-TMSI or IMSI | M |
| Old routing area identification | M |
| MS Radio Access capability | M |
| Old P-TMSI signature | O |
| Requested READY timer value | O |
| TMSI status | O |
| PS LCS Capability | O |

(b) ROUTING AREA UPDATE REQUEST (REL-7)

| Information Element | Presence |
|---|---|
| Protocol discriminator | M |
| Skip indicator | M |
| Routing area update request message identity | M |
| Update type | M |
| GPRS ciphering key sequence number | M |
| Old routing area identification | M |
| MS Radio Access capability | M |
| Old P-TMSI signature | O |
| Requested READY timer value | O |
| DRX parameter | O |
| TMSI status | O |
| P-TMSI | O |
| MS network capability | O |
| PDP context status | O |
| PS LCS Capability | O |
| MBMS context status | O |

(c) MS network capability (REL-7)

```
<MS network capability value part> ::=
  <GEA1 bits>
  <SM capabilities via dedicated channels: bit>
  <SM capabilities via GPRS channels: bit>
  <UCS2 support: bit>
  <SS Screening Indicator: bit string(2)>
  <SoLSA Capability : bit>
  <Revision level indicator: bit>
  <PFC feature mode: bit>
  <Extended GEA bits>
  <LCS VA capability: bit>
  <PS inter-RAT HO to UTRAN Iu mode capability: bit>
  <Spare bits>;
  ...
```

FIG. 8

MOBILE DEVICE REDIRECTING TECHNOLOGY

TECHNICAL FIELD

The present invention relates to a mobile terminal and a mobile communication method which perform communication in an overlapped area between a cell in which communication with a UMTS is available and a cell in which communication with an LTE system is available.

BACKGROUND ART

In recent years, research has been done on a redirecting technology which can redirect rapidly a mobile terminal UE within communicating distance of a cell in which communication with a Universal Mobile Telecommunications System (UMTS) is available (hereinafter referred to as a UMTS cell) to a cell in which communication with a Long Term Evolution (LTE) system is available (hereinafter referred to as an LTE cell), in an overlapped area between the UMTS cell and the LTE cell. The LTE cell can provide higher-performance communications service (for example, Non Patent Literature 1).

FIG. 11 is a diagram showing an example of the redirecting technology. In FIG. 11, when the mobile terminal UE currently visited in the UMTS cell initiates communication in the overlapped area with the LTE cell, "RRC CONNECTION REQUEST" for requesting a Radio Resource Control (RRC) connection setup is transmitted to a radio control apparatus RNC of the UMTS system (Step S1001).

When an LTE supported identifier for indicating that the LTE system can be supported is included in the "RRC CONNECTION REQUEST" received from the mobile terminal UE, the radio control apparatus RNC determines that the mobile terminal UE should be redirected to the LTE cell, and transmits "RRC CONNECTION REJECT" for rejecting the RRC connection setup to the mobile terminal UE (Step S1002).

The mobile terminal UE is redirected to the LTE cell according to an instruction for being redirected to the LTE cell included in the "RRC CONNECTION REJECT" received from the radio control apparatus RNC, and the transmits "RRC CONNECTION REQUEST" to a wireless base station eNB of the LTE system (Step S1003). The mobile terminal UE sets up the RRC connection with the base transceiver stations eNB (Step S1004).

CITATION LIST

Non Patent Literature

Non Patent Literature 1: 3GPP TS25.331 v8.9.0: Radio Resource Control (RRC)

SUMMARY OF THE INVENTION

Technical Problem

By the way, the mobile terminal UE redirected to the LTE cell by the above-mentioned redirecting technology becomes possible to communicate with the LTE system by performing location registration to tracking area after setting up the RRC connection with the wireless base station eNB. However, for example, when the mobile terminal UE has not contracted with the home Public Land Mobile Network (PLMN) so that communications services of the LTE system may be provided even if the mobile terminal UE is visited in communicating distance of the LTE cell of the home PLMN, and when a roaming destination PLMN has not contracted with home PLMN so that roaming services of the LTE system may be provided even if the mobile terminal UE is visited in communicating distance of the LTE cell of the roaming destination PLMN, the mobile terminal UE will fail in the location registration to the tracking area, and cannot initiate communication with the LTE system.

In this case, the mobile terminal UE is returned to the UMTS cell in order to try resetting of the RRC connection with the radio control apparatus RNC of the UMTS system. However, since this mobile terminal UE will be redirected to the LTE cell by the above-mentioned redirecting technology, the mobile terminal UE will be returned to the UMTS cell without the ability to start the communication in the LTE cell of the redirected destination, and will repeat operation of being redirected to the LTE cell without the ability to start the communication in the UMTS cell using the redirecting technology.

Thus, when the mobile terminal UE redirected from the UMTS cell to the LTE cell by the redirecting technology cannot start the communication with the LTE system, it was a problem that it becoming impossible to initiate the communication in either the UMTS system or the LTE system, as a result of repeating being redirected between the LTE cell and the UMTS cell.

The present invention is achieved in consideration of the above mentioned point, an object of the present invention is to provide a mobile terminal and a mobile communication method which enable the start of the communication with the UMTS system, even when the mobile terminal UE redirected from the UMTS cell to the LTE cell by the redirecting technology cannot start the communication with the LTE system.

Solution to Problem

A mobile terminal of the present invention is instructed to be redirected from a first cell to a second cell from a first wireless access apparatus, in an overlapped area between the first cell in which communication with a first system is available and the second cell in which communication with a second system is available, by transmitting a connection request signal including a supported identifier for indicating that the second system is supported to the first wireless access apparatus of the first system. The mobile terminal includes a connection setting process unit configured to execute a connection setting process with the first wireless access apparatus while being turned into a state of not supporting the second system, when receiving a location registration failure signal for indicating that location registration to the second location registered area of the second system is ended in failure.

According to the above structure, since the connection setting process with the first wireless access apparatus is executed while being turned into the state of not supporting the second system when receiving the location registration failure signal for indicating that the location registration to the second location registered area is ended in failure, the mobile terminal can start the communication with the first system without being redirecting to the second cell, even when re-communication is requested after returning to the first cell without the ability to start the communication with the second system.

Moreover, in the above-mentioned mobile terminal of the present invention, the connection setting process unit may transmit a connection request signal not including the supported identifier to the first wireless access apparatus, and may transmit a connection setting completion signal including a not-supported identifier which indicates not supporting the second system and a handover not-supported identifier which indicates not supporting a handover between systems from the first system to the second system to the first wireless access apparatus, after setting a connection with the first wireless access apparatus in response to the connection setting signal received from the first wireless access apparatus, and thereby the connection setting process may be executed while being turned into the state of not supporting the second system.

Moreover, in the above-mentioned mobile terminal of the present invention, when other public land mobile networks (PLMN) are selected, or when an electronic power supply of the mobile terminal is turned ON, the connection setting process unit may execute the connection setting process while being turned into a state of supporting the second system.

Moreover, the above-mentioned mobile terminal of the present invention may further include a storage unit configured to store a supporting state identifier for indicating to be turned into the state of supporting the second system when an electronic power supply of the mobile terminal is turned OFF. The connection setting process unit may execute the connection setting process while being turned into the state of supporting the second system, in response to the supporting state identifier stored in the storage unit, when the electronic power supply of the mobile terminal is turned ON.

Moreover, in the above-mentioned mobile terminal of the present invention, the connection setting process unit may transmit a connection request signal including the supported identifier to the first wireless access apparatus, and thereby the connection setting process may be executed while being turned into the state of supporting the second system.

Moreover, the above-mentioned mobile terminal of the present invention may further include a location registration process unit configured to transmit a location registration request signal not including associated information which indicates that the second system is supported to a switching apparatus of the first system when the location registration failure signal is received, and thereby a location registration process to a first location registered area of the first system is executed while being turned into the state of not supporting the second system.

Moreover, in the above-mentioned mobile terminal of the present invention, the location registration process unit may transmit the location registration request signal including the associated information to the switching apparatus of the first system when other public land mobile networks (PLMN) are selected, or when an electronic power supply of the aforesaid mobile terminal is turned ON, and thereby the location registration process may be executed while being turned into the state of supporting the second system.

Moreover, the above-mentioned mobile terminal of the present invention may further include a storage unit configured to store a supporting state identifier for indicating to be turned into the state of supporting the second system when the electronic power supply of the mobile terminal is turned OFF. The location registration process unit may transmit the location registration request signal including the associated information to the switching apparatus of the first system in response to the supporting state identifier stored in the storage unit, when the electronic power supply of the mobile terminal is turned ON, and thereby the location registration process may be executed while being turned into the state of supporting the second system.

Moreover, in the above-mentioned mobile terminal of the present invention, the location registration failure signal may indicate that the location registration to the second location registered area is ended in failure because there is no suitable second cell in the second location registered area.

Moreover, in a mobile communication method of the present invention, a mobile terminal is instructed to be redirected from a first cell to a second cell by a first wireless access apparatus, in an overlapped area between the first cell in which communication with a first system is available and the second cell in which communication with a second system is available, by transmitting a connection request signal including a supported identifier for indicating that the second system is supported from the mobile terminal to the first wireless access apparatus of the first system. The mobile terminal executes a connection setting process with the first wireless access apparatus while being turned into a state of not supporting the second system, when receiving a location registration failure signal for indicating that location registration to the second location registered area of the second system is ended in failure.

Advantageous Effects of Invention

According to the present invention, it can provide the mobile terminal and the mobile communication method which enable the start of the communication with the UMTS system, even when the mobile terminal UE redirected from the UMTS cell to the LTE cell by redirecting technology cannot start the communication with the LTE system.

BRIEF DESCRIPTION OF DRAWINGS

FIG. 3 shows an example of a message format of "RRC CONNECTION REQUEST" according to the first embodiment of the present invention.

FIG. 4 shows another example of the message format of "RRC CONNECTION REQUEST" according to the first embodiment of the present invention.

FIG. 5 shows an example of a message format of "RRC CONNECTION SETUP COMPLETE" according to the first embodiment of the present invention.

FIG. 6 shows another example of the message format of "RRC CONNECTION SETUP COMPLETE" according to the first embodiment of the present invention.

FIG. 7 shows an example of a message format of "ATTACH REQUEST/ROUTING AREA UPDATE REQUEST" according to the first embodiment of the present invention.

FIG. 8 shows another example of the message format of "ATTACH REQUEST/ROUTING AREA UPDATE REQUEST" according to the first embodiment of the present invention.

DESCRIPTION OF EMBODIMENTS

Figure 1:
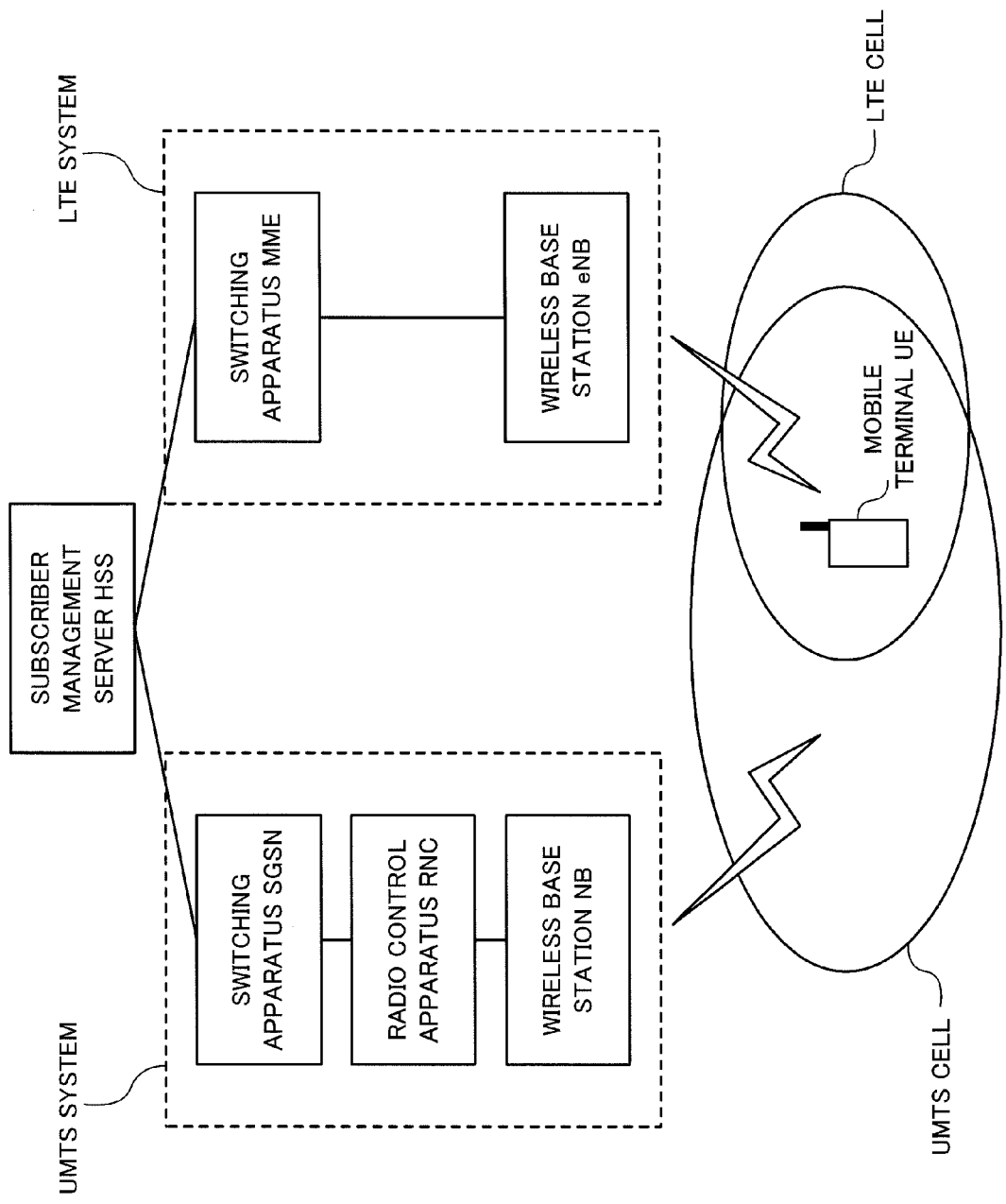
FIG. 1 is a configuration diagram of a mobile communication system according to a first embodiment of the present invention.

Hereinafter, embodiments of the present invention will now be described. Note that in the description of the following drawings, the same or similar reference numeral is attached to the same or similar part.

<Schematic Structure of Whole Mobile Communication System>

FIG. 1 is a configuration diagram of a mobile communication system according to a first embodiment. As shown in FIG. 1, the mobile communication system is composed of: a UMTS system including a wireless base station NB, a radio control apparatus RNC, and a switching apparatus SGSN; an LTE system including a wireless base station eNB and a switching apparatus MME; a mobile terminal UE connectable with both of the UMTS system and the LTE system; and a subscriber management server HSS for managing location registered area where the mobile terminal UE belongs.

The wireless base station NB of the UMTS system constitutes a UMTS cell (fist cell) in which communication with the UMTS system (first system) is available. The radio control apparatus RNC (first wireless access apparatus) sets up an RRC connection to the mobile terminal UE within communicating distance of the UMTS cell. The switching apparatus SGSN executes a location registration process of the mobile terminal UE to routing area (first location registered area) for the subscriber management server HSS. In this case, the routing area is location registered area of the UMTS system, and is composed of one or more UMTS cells.

The wireless base station eNB (second wireless access apparatus) of the LTE system constitutes an LTE cell (second cell) in which communication with the LTE system (second system) is available, and sets up an RRC connection to the mobile terminal UE visited in communicating distance of the LTE cell. The switching apparatus MME executes a location registration process of the mobile terminal UE to tracking area (second location registered area) for the subscriber management server HSS. In this case, the tracking area is location registered area of the LTE system, and is composed of one or more LTE cells.

When the mobile terminal UE is within communicating distance of the UMTS cell in overlapped area between the UMTS cell and the LTE cell, the mobile terminal UE transmits "RRC CONNECTION REQUEST (connection request signal)" including an LTE supported identifier (supported identifier), which indicates support of the LTE system to the radio control apparatus RNC of the UMTS system, and then is instructed from the radio control apparatus RNC so as to be redirected from the UMTS cell to the LTE cell.

<Structure of Mobile Terminal UE>

Figure 2:
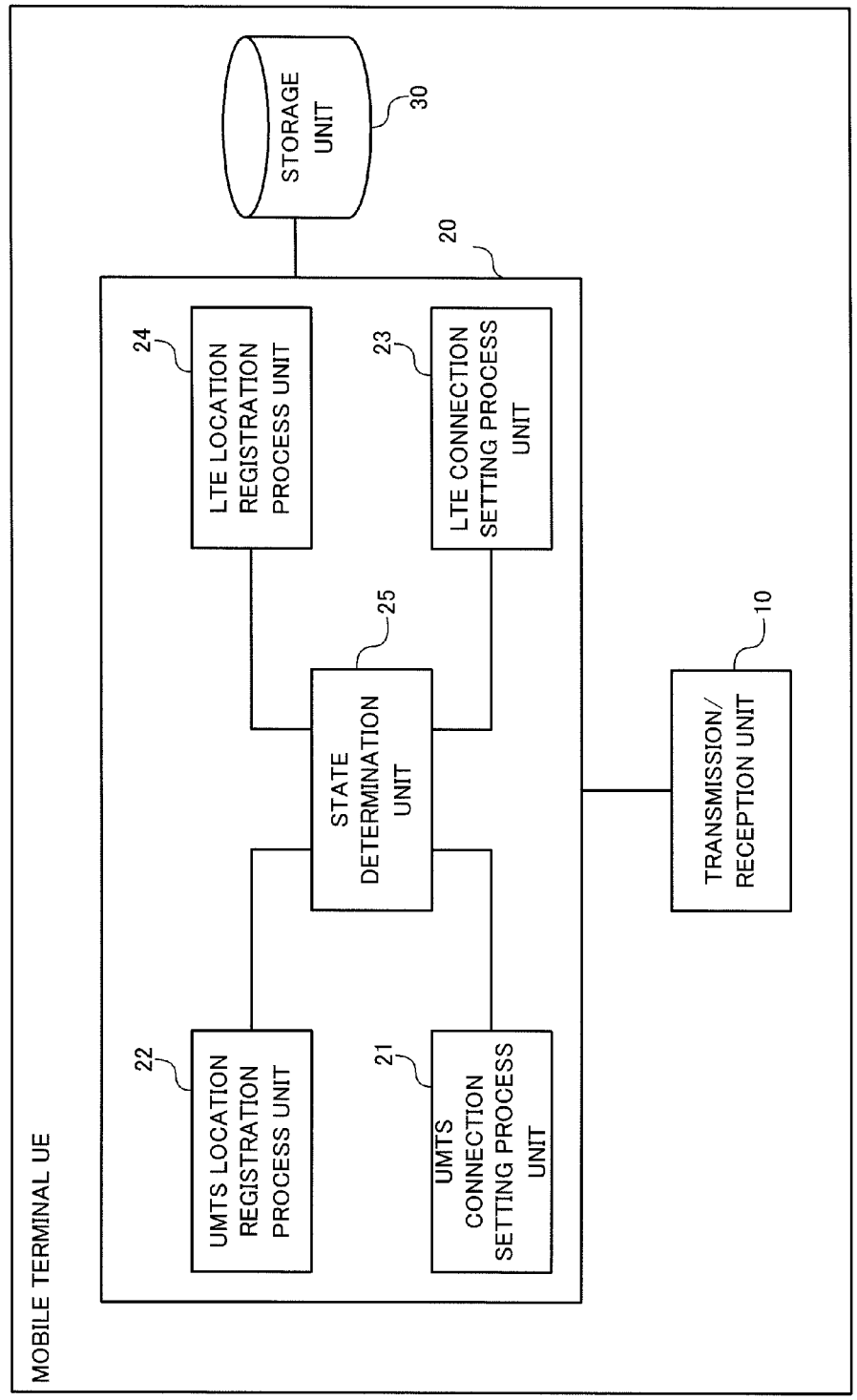
FIG. 2 is a functional block diagram of a mobile terminal according to the first embodiment of the present invention.

Next, a structure of the mobile terminal UE according to the first embodiment will now be explained. FIG. 2 is a configuration diagram of the mobile terminal UE according to the first embodiment. As shown in FIG. 2, the mobile terminal UE is composed of a transmission/reception unit 10, a communication control part 20, and a storage unit 30. Note that the mobile terminal UE has hardware including a communication interface, a processor, a memory, a display, and an input key, and a software module executed by the processor is stored in the memory. The following functions of the transmission/reception unit 10 and/or the communication control part 20 may be achieved by the above-mentioned hardware, the software module executed by the processor, or both of combination thereof. Moreover, the function of the storage unit 30 may be achieved not only by the above-mentioned memory but also by Universal Subscriber Identity Module (USIM) etc. inserted in the mobile terminal UE.

The transmission/reception unit 10 sets up a radio channel with the wireless base station NB or the wireless base station eNB, and a radio frequency signal is transmitted and received via the set-up radio channel. More specifically, the transmission/reception unit 10 applies a coding process, a modulation process, etc. to a signal generated by the communication control part 20, and transmits the signal to the wireless base station NB or the wireless base station eNB via the radio channel. Moreover, the transmission/reception unit 10 applies a demodulating process, a decoding process, etc. to a signal received from the wireless base station NB or the wireless base station eNB, and notifies the received signal to the communication control part 20.

The communication control part 20 controls the transmission/reception unit 10 to transmit and receive the signal logically between the radio control apparatus RNC, the switching apparatus SGSN, the wireless base station eNB, and the switching apparatus MME. The communication control part 20 includes a UMTS connection setting process unit 21, a UMTS location registration process unit 22, an LTE connection setting process unit 23, an LTE location registration process unit 24, and a state determination unit 25.

When to be turned into a state of not supporting the LTE system is determined by the state determination unit 25 described later, the UMTS connection setting process unit 21 executes a connection setting process with the radio control apparatus RNC while being turned into a state of not supporting the LTE system.

More specifically, the UMTS connection setting process unit 21 transmits "RRC CONNECTION REQUEST" not including an LTE supported identifier to the radio control apparatus RNC, when to be turned into the state of not supporting the LTE system is determined.

In this case, "RRC CONNECTION REQUEST" is a connection request signal for requesting the RRC connection setup. Moreover, the LTE supported identifier (supported identifier) indicates support of the LTE system, and "Pre-redirection info", or "Support of E-UTRA FDD" turned into "TRUE" may be used, for example.

FIG. 3 shows an example of a message format of "RRC CONNECTION REQUEST." The message format shown in FIG. 3 includes an information element, "Pre-redirection info." The UMTS connection setting process unit 21 may generate the "RRC CONNECTION REQUEST" not including the LTE supported identifier by using the message format shown in FIG. 3 without specifying the information element "Pre-redirection info."

FIG. 4 shows another example of the message format of "RRC CONNECTION REQUEST." The message format shown in FIG. 4 does not include the information element "Pre-redirection info." The UMTS connection setting process unit 21 may generate "RRC CONNECTION REQUEST" not including the LTE supported identifier by using the message format shown in FIG. 4.

Moreover, when to be turned into the state of not supporting the LTE system is determined, the UMTS connection setting process unit 21 transmits "RRC CONNECTION SETUP COMPLETE" including an LTE not-supported identifier and an LTE-HO not-supported identifier to the radio control apparatus RNC, in response to "RRC CONNECTION SETUP" received from the radio control apparatus RNC. When to be turned into the state of not supporting the LTE system is determined, the UMTS connection setting process unit 21 may transmit "RRC CONNECTION SETUP COMPLETE" not including the LTE supported identifier and the LTE-HO supported identifier to the radio control apparatus RNC.

In this case, the "RRC CONNECTION SETUP" is a connection setting signal for setting up the RRC connection. Moreover, the "RRC CONNECTION SETUP COMPLETE"

is a connection setting completion signal for notifying completion of the RRC connection setup.

Furthermore, the LTE-HO supported identifier (handover supported identifier) indicates support of a handover between the systems from the UMTS system to the LTE system, and "Support of Inter-RAT PS Handover to E-UTRAN" turned into "TRUE" is used, for example. Moreover, the LTE not-supported identifier (not-supported identifier) indicates non-support of the LTE system, and "Support of E-UTRA FDD" turned into "FALSE" is used, for example. Moreover, the LTE-HO not-supported identifier (handover not-supported identifier) indicates non-support of a handover between the systems from the UMTS system to the LTE system, and "Support of Inter-RAT PS Handover to E-UTRAN" turned into "FALSE" is used, for example.

FIG. 5 shows an example of the message format of "RRC CONNECTION SETUP COMPLETE." The message format shown in FIG. 5(a) includes an information element "UE radio access capability", and the "UE radio access capability" includes an information element "UE Multi-mode/Multi-RAT capability", as shown in FIG. 5(b). Furthermore, as shown in FIG. 5(c), the "UE Multi-mode/Multi-RAT capability" includes information elements "Support of E-UTRA FDD" and "Support of Inter-RAT PS Handover to E-UTRA FDD." The UMTS connection setting process unit 21 may generate the "RRC CONNECTION SETUP COMPLETE" including the LTE not-supported identifier and the LTE-HO not-supported identifier by using the message format shown in FIGS. 5(a)-(c) and turning the "Support of E-UTRA FDD" and "Support of Inter-RAT PS Handover to E-UTRA FDD" into "FALSE."

FIG. 6 shows another example of the message format of "RRC CONNECTION SETUP COMPLETE." In the message format shown in FIGS. 6(a)-(c), the "UE Multi-mode/Multi-RAT capability" shown in FIG. 6(c) does not includes the "Support of E-UTRA FDD" and the "Support of Inter-RAT PS Handover to E-UTRA FDD." The UMTS connection setting process unit 21 may generate the "RRC CONNECTION SETUP COMPLETE" not including the LTE supported identifier and the LTE-HO supported identifier by using the message format shown in FIGS. 6(a)-(c).

The UMTS connection setting process unit 21 transmits the "RRC CONNECTION REQUEST" including the LTE supported identifier to the radio control apparatus RNC, when to be turned into the state of supporting the LTE system is determined by the state determination unit 25. For example, the UMTS connection setting process unit 21 may generate the "RRC CONNECTION REQUEST" including the LTE supported identifier by using the message format shown in FIG. 3 and specifying the "Pre-redirection info."

Moreover, when to be turned into the state of supporting the LTE system is determined by the state determination unit 25, the UMTS connection setting process unit 21 transmits the "RRC CONNECTION SETUP COMPLETE" including the LTE supported identifier to the radio control apparatus RNC, in response to the "RRC CONNECTION SETUP" received from the radio control apparatus RNC. The UMTS connection setting process unit 21 may generate "RRC CONNECTION REQUEST" including the LTE supported identifier by using the message format shown in FIGS. 5(a)-(c) and turning the "Support of E-UTRA FDD" into "TRUE." The UMTS connection setting process unit 21 may transmit the "RRC CONNECTION SETUP" including the LTE-HO supported identifier (for example, "Support of Inter-RAT PS Handover to E-UTRA FDD" turned into "TRUE") added to the LTE supported identifier to the radio control apparatus RNC, when the mobile terminal UE includes a function to execute the handover between the systems from the UMTS system to the LTE system.

Moreover, when the "RRC CONNECTION REQUEST" including the LTE supported identifier is transmitted to the radio control apparatus RNC, the UMTS connection setting process unit 21 receives "RRC CONNECTION REJECT", including an instruction for redirecting to the LTE cell, from the radio control apparatus RNC. In this case, the "RRC CONNECTION REJECT" is a connection rejection signal for rejecting the RRC connection setup. As the instruction for redirecting to the LTE cell, "Redirection info" is used, for example.

When to be turned into the state of not supporting the LTE system is determined by the state determination unit 25, the UMTS location registration process unit 22 executes the location registration process of the mobile terminal UE to the routing area while being turned into the state of not supporting the LTE system.

More specifically, when to be turned into the state of not supporting the LTE system is determined by the state determination unit 25, the UMTS location registration process unit 22 transmits "ATTACH REQUEST/ROUTING AREA UPDATE REQUEST" which does not include LTE support associated information to the switching apparatus SGSN.

In this case, the "ATTACH REQUEST/ROUTING AREA UPDATE REQUEST" is a location registration request signal for requesting the location registration to the routing area. The UMTS location registration process unit 22 performs any one of "ATTACH" and "ROUTING AREA UPDATE" according to location-registered condition (first-time registration or update) to the routing area. Hereinafter, these processes are named "ATTACH/ROUTING AREA UPDATE" generically to give the explanation.

The LTE support associated information (associated information) is associated information for indicating the support of the LTE system, and includes "PS inter-RAT HO to E-UTRAN S1 mode capability", "CSFB capability", "ISR support", "SRVCC to GERAN/UTRAN capability", "EPC capability", etc. which are turned into "1 (support)", for example.

FIG. 7 shows an example of a message format of "ATTACH REQUEST/ROUTING AREA UPDATE REQUEST." The message format shown in FIGS. 7(a) and (b) includes "MS network capability", and the "MS network capability" includes the above-mentioned LTE support associated information, as shown in FIG. 7(c). The UMTS connection setting process unit 21 may generate the "ATTACH REQUEST/ROUTING AREA UPDATE REQUEST" not including the LTE support associated information by using the message format shown in FIG. 7(a) or (b) without specifying the LTE support associated information shown in FIG. 7(c).

FIG. 8 shows another example of the message format of the "ATTACH REQUEST/ROUTING AREA UPDATE REQUEST." The message format shown in FIG. 8(c) does not include the LTE support associated information. The UMTS connection setting process unit 21 may generate the "ATTACH REQUEST/ROUTING AREA UPDATE REQUEST" not including the LTE support associated information by using the message format shown in FIG. 8.

Moreover, when to be turned into the state of supporting the LTE system is determined by the state determination unit 25, the UMTS location registration process unit 22 transmits the "ATTACH REQUEST/ROUTING AREA UPDATE REQUEST" including the LTE support associated information to the switching apparatus SGSN. The UNITS location registration process unit 22 may generate the "ATTACH REQUEST/ROUTING AREA UPDATE REQUEST"

including the LTE support associated information by using the message format shown in FIGS. 7(a)-(c) with specifying the LTE support associated information.

The LTE connection setting process unit 23 sets up connection with the wireless base station eNB. More specifically, the LTE connection setting process unit 23 transmits "RRC CONNECTION REQUEST" to the wireless base station eNB. Moreover, the LTE connection setting process unit 23 transmits "RRC CONNECTION SETUP COMPLETE" to the wireless base station eNB in response to "RRC CONNECTION SETUP" received from the wireless base station eNB.

The LTE location registration process unit 24 executes a location registration process of the mobile terminal UE to the tracking area. More specifically, the UMTS location registration process unit 22 transmits "ATTACH REQUEST/TRACKING AREA UPDATE REQUEST" to the switching apparatus MME. In this case, the "ATTACH REQUEST/TRACKING AREA UPDATE REQUEST" is a location registration request signal for requesting location registration to the tracking area.

Moreover, the LTE location registration process unit 24 receives "ATTACH REJECT/TRACKING AREA UPDATE REJECT" received from the switching apparatus MME. In this case, the "ATTACH REJECT/TRACKING AREA UPDATE REJECT" is a location registration failure signal for indicating that a failure occurs in the location registration to the tracking area. Moreover, the "ATTACH REJECT/TRACKING AREA UPDATE REJECT" includes "Failure Cause." The "Failure Cause" indicates a failure cause of the location registration to the tracking area, and includes "#15 (there is no cell suitable in the tracking area)" etc., for example.

The UMTS location registration process unit 22 executes any one of the "ATTACH" and the "TRACKING AREA UPDATE" in response to the location-registered condition (first-time registration or update) to the tracking area. Hereinafter, these processes will be explained as being generically named "ATTACH/TRACKING AREA UPDATE."

The state determination unit 25 determines whether to be turned into a supporting state (Activated) of supporting the LTE system, or turned into a not-supporting state (Deactivated) of not supporting the LTE system. More specifically, the state determination unit 25 determines to be turned into the state of not supporting the LTE system, when the "ATTACH REJECT/TRACKING AREA UPDATE REQUEST" including "Failure Cause #15" is received from the switching apparatus MME. Note that the state determination unit 25 maintains the LTE system to the state of not supporting the LTE system until to be turned into the state of supporting the LTE system is determined.

The state determination unit 25 determines to be turned into the state of supporting the LTE system, when some other PLMN is selected, or when an electronic power supply of the mobile terminal UE is turned ON. Moreover, the state determination unit 25 may store a supporting state identifier for indicating the state of supporting the LTE system in the storage unit 30, when the electronic power supply of the mobile terminal UE is turned OFF. In this case, the state determination unit 25 may determine to be turned into the state of supporting the LTE system according to the supporting state identifier stored in the storage unit 30, when the electronic power supply of the mobile terminal UE is turned ON.

In this case, ON and OFF of the electronic power supply of the mobile terminal UE may be turned when receiving operations from a user of the mobile terminal UE, and may be automatically turned at predetermined time by a timer etc.

Moreover, the state determination unit 25 maintains the LTE system to the state of supporting the LTE system until to be turned into the state of not supporting the LTE system is determined.

<Operation of Mobile Communication System>

Next, operation of the mobile communication system composed as mentioned above will be explained.

(1) Non-Support State (Deactivated)

Figure 9:
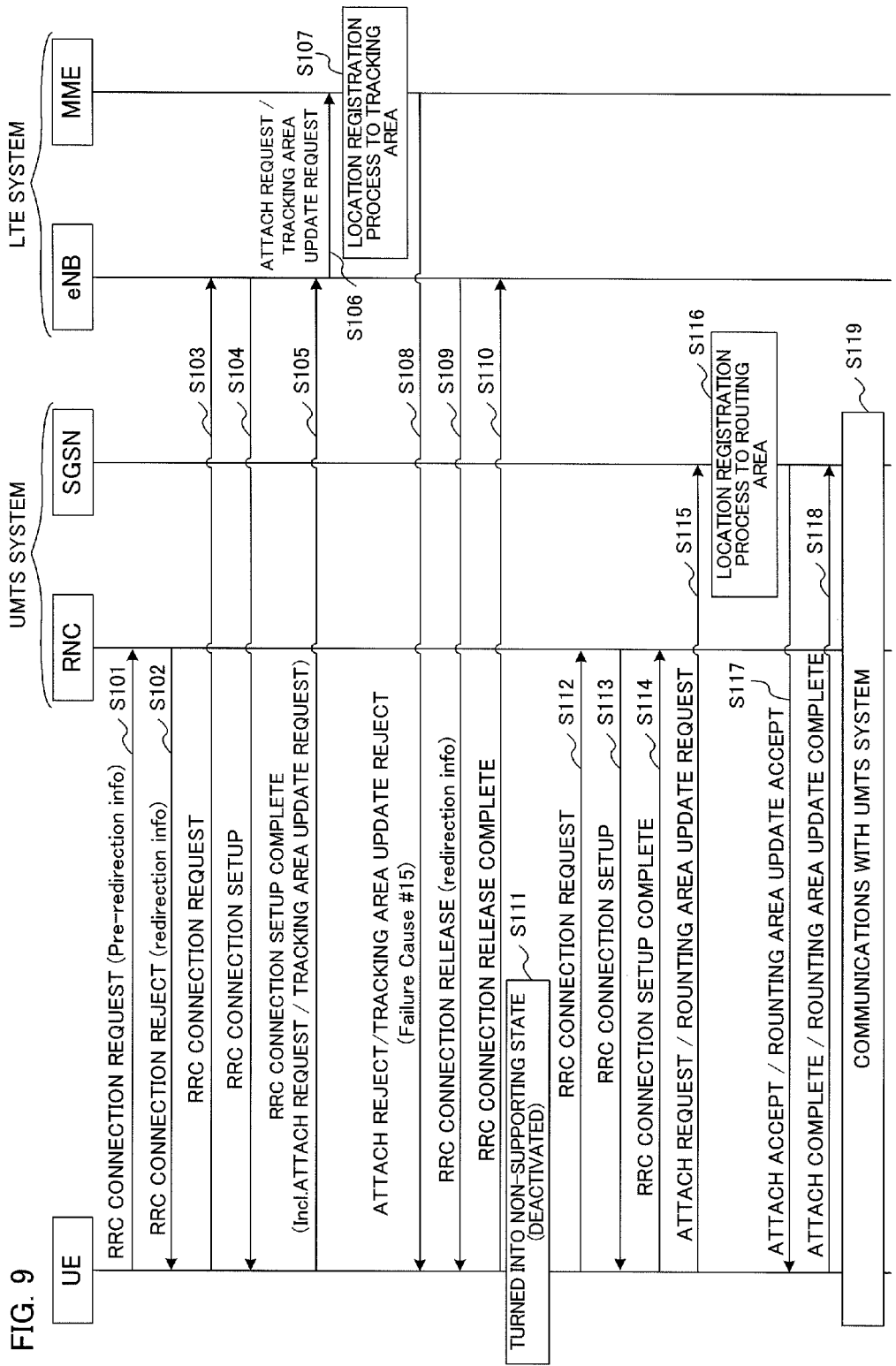
FIG. 9 is a sequence diagram showing a mobile communication method according to the first embodiment of the present invention.

FIG. 9 is a sequence diagram showing operation in which the mobile terminal UE is turned into a state of not supporting the LTE system to start communication. In FIG. 9, the mobile terminal UE has a function in which communication is available in any one of the UMTS cell and the LTE cell. Moreover, it is assumed that the mobile terminal UE is visited in communicating distance of any one of the home PLMN and the roaming destination PLMN. Both of the home PLMN and the roaming destination PLMN provides the UMTS cell and the LTE cell. In addition, it is assumed that, when the mobile terminal UE is visited in communicating distance of the home PLMN, a contract for providing communications service of the UMTS system (hereinafter, UMTS contract) is secured between the mobile terminal UE and the home PLMN, but a contract for providing communications service of the LTE system (hereinafter, LTE contract) is not secured between the mobile terminal UE and the home PLMN. On the other hand, it is assumed that, when the mobile terminal UE is visited in communicating distance of the roaming destination PLMN, a contract for providing roaming service of the UMTS system (hereinafter, UMTS roaming contract) is secured between the roaming destination PLMN and the home PLMN, but a contract for providing roaming service of the LTE system (hereinafter LTE roaming contract) is not secured between the roaming destination PLMN and the home PLMN.

In overlapped area between the UMTS cell and the LTE cell, the mobile terminal UE within communicating distance of the UMTS cell transmits "RRC CONNECTION REQUEST" including "Pre-redirection info" which is an LTE supported identifier to the radio control apparatus RNC (Step S101). Since the LTE supported identifier is included in the "RRC CONNECTION REQUEST" received from the mobile terminal UE, the radio control apparatus RNC transmits "RRC CONNECTION REJECT" including "Redirection info" which is an instruction for being redirected to the LTE cell to the mobile terminal UE (Step S102).

The mobile terminal UE is redirected to the LTE cell according to the instruction for being redirected included in the "RRC CONNECTION REJECT" received from the radio control apparatus RNC, and then transmits "RRC CONNECTION REQUEST" to the wireless base station eNB (Step S103). The wireless base station eNB transmits "RRC CONNECTION SETUP" to the mobile terminal UE in response to the "RRC CONNECTION REQUEST" received from the mobile terminal UE (Step S104). The mobile terminal UE transmits "RRC CONNECTION SETUP COMPLETE" to the wireless base station eNB in response to the "RRC CONNECTION SETUP" received from the wireless base station eNB, and thereby the connection setting process with the wireless base station eNB is completed (Step S105). Note that "ATTACH REQUEST/TRACKING AREA UPDATE REQUEST" for requesting location registration to the tracking area in order to start the communication in the LTE system is included in the "RRC CONNECTION SETUP COMPLETE."

The wireless base station eNB transmits "ATTACH REQUEST/TRACKING AREA UPDATE REQUEST" included in the "RRC CONNECTION SETUP COMPLETE" received from the mobile terminal UE to the switching apparatus MME (Step S106). The switching apparatus MME executes the location registration process to the tracking area with the subscriber management server HSS (not shown) in response to the "ATTACH REQUEST/TRACKING AREA UPDATE REQUEST" received from the mobile terminal UE (S107).

In this sequence diagram, as mentioned above, since the LTE contract is not secured between the mobile terminal UE and the home PLMN when the mobile terminal UE is within communicating distance of the home PLMN, and the LTE roaming contract is not secured between the roaming destination PLMN and the home PLMN when the mobile terminal UE is visited in communicating distance of the roaming destination PLMN, the location registration process of the mobile terminal UE to the tracking area will end in failure. The switching apparatus MME transmits "ATTACH REJECT/TRACKING AREA UPDATE REJECT" for indicating that the location registration has ended in failure caused by "Failure Cause #15 (there is no cell suitable in the tracking area)" to the mobile terminal UE (Step S108).

The wireless base station eNB transmits "RRC CONNECTION RELEASE" for requesting release of the RRC connection set up by Steps S103-S105 to the mobile terminal UE in response to instructions (not shown) received from the switching apparatus MME (Step S109). Note that an instruction for being redirected to the UMTS cell is included in the "RRC CONNECTION RELEASE." As the instruction for being redirected to the UMTS cell, "Redirection info" is used, for example.

The mobile terminal UE transmits "RRC CONNECTION RELEASE COMPLETE" for releasing the RRC connection to the wireless base station eNB in response to the "RRC CONNECTION RELEASE" received from the wireless base station eNB (Step S110). Moreover, the mobile terminal UE is redirected to the UMTS cell according to the instruction for being redirected included in the "RRC CONNECTION RELEASE" received from the wireless base station eNB.

The mobile terminal UE determines to be turned into the state of not supporting the LTE system in response to the reception of "ATTACH REJECT/TRACKING AREA UPDATE REQUEST" in Step S108 (Step S111).

The mobile terminal UE transmits "RRC CONNECTION REQUEST" not including the LTE supported identifier to the radio control apparatus RNC (Step S112). Since the LTE supported identifier is not included in the "RRC CONNECTION REQUEST" received from the mobile terminal UE, the radio control apparatus RNC transmits "RRC CONNECTION SETUP" for setting the RRC connection to the mobile terminal UE (Step S113).

The mobile terminal UE transmits "RRC CONNECTION SETUP COMPLETE" including the LTE not-supported identifier and the LTE-HO not-supported identifier in response to the "RRC CONNECTION SETUP" received from the radio control apparatus RNC, and thereby the connection setting process with the radio control apparatus RNC is completed (Step S114).

The mobile terminal UE transmits "ATTACH REQUEST/ROUTING AREA UPDATE REQUEST" for requesting location registration to the routing area to the switching apparatus SGSN, in order to start communication with the UMTS system (Step S115). The switching apparatus SGSN executes a location registration process to the routing area with the subscriber management server HSS (not shown) in response to the "ATTACH REQUEST/ROUTING AREA UPDATE REQUEST" received from the mobile terminal UE (S116).

In this sequence diagram, as mentioned above, since the UMTS contract is secured between the mobile terminal UE and the home PLMN when the mobile terminal UE is within communicating distance of the home PLMN, and the UMTS roaming contract is secured between the roaming destination PLMN and the home PLMN when the mobile terminal UE is within communicating distance of the roaming destination PLMN, the location registration process of the mobile terminal UE to routing area will be successful. The switching apparatus SGSN transmits "ATTACH ACCEPT/ROUTING AREA UPDATE ACCEPT" for notifying that the location registration to the routing area has been successful to the mobile terminal UE (Step S117).

The mobile terminal UE transmits "ATTACH COMPLETE/ROUTING AREA UPDATE COMPLETE" to the switching apparatus SGSN in response to the "ATTACH ACCEPT/ROUTING AREA UPDATE ACCEPT" received from the switching apparatus SGSN (Step S118). Then, the location registration process to the routing area is completed, and then the mobile terminal UE starts the communication with the UMTS system (Step S119).

(2) Support State (Activated)

Figure 10:
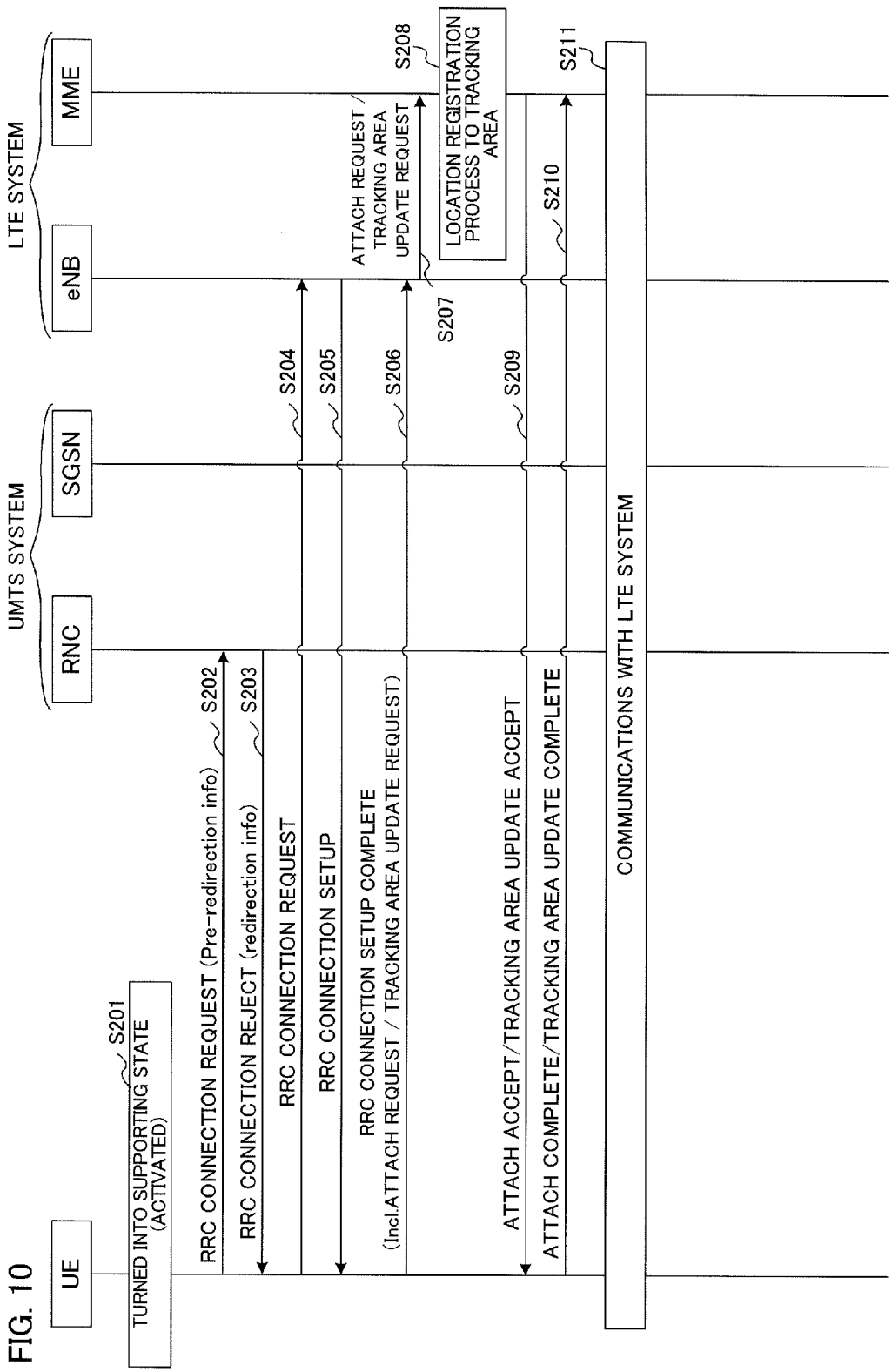
FIG. 10 is a sequence diagram showing the mobile communication method according to the first embodiment of the present invention.
Figure 11:
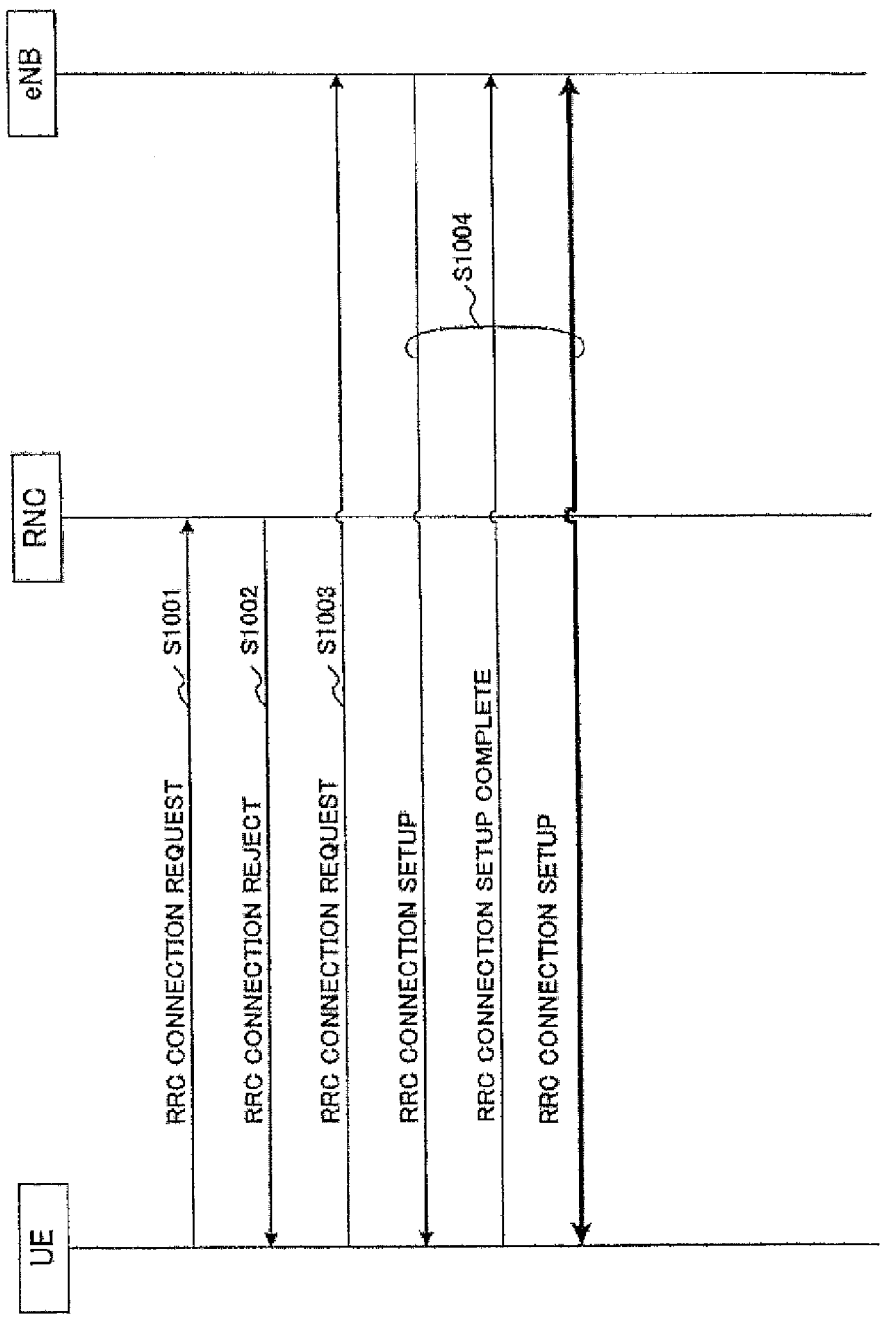
FIG. 11 is a sequence diagram showing a conventional mobile communication method.

FIG. 10 is a sequence diagram showing operation of being turned into the state of supporting the LTE system to start the communication. In FIG. 10, it is assumed that the mobile terminal UE is in the state of not supporting the LTE system.

The mobile terminal UE determines to be turned into the state of supporting the LTE system, when a PLMN selection process is executed (Step S201). In this case, the PLMN selection process is a process for selecting PLMN which provides the UMTS cell and the LTE cell, and is executed when being redirected from the roaming destination PLMN to PLMN of a roaming source (home), for example. In this sequence, it is assumed that a contract for providing communications service of both of the UMTS system and the LTE system is secured between the mobile terminal UE and the PLMN selected in the PLMN selection process.

In the overlapped area between the selected UMTS cell and the LTE cell of the PLMN, as explained in Steps S101-S105 of FIG. 9, the mobile terminal UE within communicating distance of the UMTS cell is redirected to the LTE cell according to the instruction for being redirected to the LTE cell received from the radio control apparatus RNC, and executes the connection setting process with the wireless base station eNB (Steps S202-S206).

The mobile terminal UE transmits "ATTACH REQUEST/TRACKING AREA UPDATE REQUEST" for requesting location registration to the tracking area to the switching apparatus MME in order to start the communication in the LTE system of the selected PLMN (Step S207). The switching apparatus MME executes the location registration process to the tracking area with the subscriber management server HSS (not shown) in response to the "ATTACH REQUEST/TRACKING AREA UPDATE REQUEST" received from the mobile terminal UE (S208).

In this sequence diagram, since the contract for providing the communications service of the LTE system between the mobile terminal UE and the PLMN is secured as mentioned above, the switching apparatus MME succeeds in the location registration process to the tracking area. The switching apparatus MME transmits "ATTACH ACCEPT/TRACKING AREA UPDATE ACCEPT" for notifying that the location registration to the tracking area has been successful to the mobile terminal UE (Step S209).

The mobile terminal UE transmits "ATTACH COMPLETE/TRACKING AREA UPDATE COMPLETE" to the switching apparatus MME in response to the "ATTACH ACCEPT/TRACKING AREA UPDATE ACCEPT" received from the switching apparatus MME (Step S210). The location registration process to the tracking area is completed, and then the mobile terminal UE starts the communication based on the LTE system (Step S211).

Note that, in Step S201 of FIG. 10, the mobile terminal UE determines to be turned into the state of supporting the LTE system when the PLMN selection process is executed, but may determine to be turned into the state of supporting the LTE system when the electronic power supply of the mobile terminal UE is turned ON. Moreover, the mobile terminal UE may determine to be turned into the state of supporting the LTE system, with reference to the supporting state identifier stored in the storage unit 30, when the electronic power supply of the mobile terminal UE is turned OFF.

<Operation/Working-Effect>

In accordance with the mobile communication system according to the first embodiment, since the connection setting process with the radio control apparatus RNC is executed while being turned into the state of not supporting the LTE system when the "ATTACH REJECT/TRACKING AREA UPDATE REJECT (location registration failure signal)" for indicating that the location registration to the tracking area has been ended in failure is received, the mobile terminal UE can start the communication with the UMTS system without being redirected to the LTE cell with the redirecting technology, even when returning to the UMTS cell without the ability to start the communication with the LTE system.

While the present invention is described in accordance with the aforementioned embodiments, those skilled in the art should be understood that the aforementioned embodiments described herein are not intended to limit the present invention. Various changes and modifications may be made therein without departing from the general meaning and a range of the present invention specified by the description of scope of claims. Accordingly, the description herein aims to provide illustrative explanations, and therefore does not have any restrictive meaning for the present invention.

This application is based upon Japanese Patent Application No. 2010-002719 filed on Jan. 8, 2010, the entire contents of which are incorporated herein.

The invention claimed is:

1. A mobile terminal instructed to be redirected from a first cell to a second cell by a first wireless access apparatus, in an overlapped area between the first cell in which communication with a first system is available and the second cell in which communication with a second system is available, by transmitting a connection request signal including a supported identifier for indicating that the second system is supported to the first wireless access apparatus of the first system, the mobile terminal comprising:
a connection setting processor that transmits a connection request signal not including the supported identifier to the first wireless access apparatus when receiving a location registration failure signal for indicating that location registration to the second location registered area of the second system is ended in failure, and transmits a connection setting completion signal including a not-supported identifier which indicates not supporting the second system and a handover not-supported identifier which indicates not supporting a handover between systems from the first system to the second system to the first wireless access apparatus, after setting a connection with the first wireless access apparatus in response to the connection setting signal received from the first wireless access apparatus, so as to execute a connection setting process with the first wireless access apparatus while being turned into a state of not supporting the second system.

2. The mobile terminal according to claim 1, wherein when other public land mobile networks (PLMN) are selected, or when an electronic power supply of the mobile terminal is turned ON, the connection setting processor executes the connection setting process while being turned into a state of supporting the second system.

3. The mobile terminal according to claim 2, wherein the connection setting processor transmits a connection request signal including the supported identifier to the first wireless access apparatus, and thereby the connection setting process is executed while being turned into the state of supporting the second system.

4. The mobile terminal according to claim 1, further comprising a storage unit that stores a supporting state identifier for indicating to be turned into the state of supporting the second system when an electronic power supply of the mobile terminal is turned OFF, wherein the connection setting processor executes the connection setting process while being turned into the state of supporting the second system, in response to the supporting state identifier stored in the storage unit, when the electronic power supply of the mobile terminal is turned ON.

5. The mobile terminal according to claim 1, further comprising a location registration process unit that transmits a location registration request signal not including associated information which indicates that the second system is supported to a switching apparatus of the first system when the location registration failure signal is received, and thereby a location registration process to a first location registered area of the first system is executed while being turned into the state of not supporting the second system.

6. The mobile terminal according to claim 5, wherein the location registration process unit transmits the location registration request signal including the associated information to the switching apparatus of the first system when other public land mobile networks (PLMN) are selected, or when an electronic power supply of the mobile terminal is turned ON, and thereby the location registration process is executed while being turned into the state of supporting the second system.

7. The mobile terminal according to claim 6, further comprising a storage unit that stores a supporting state identifier for indicating to be turned into the state of supporting the second system when the electronic power supply of the mobile terminal is turned OFF, wherein the location registration process unit transmits the location registration request signal including the associated information to the switching apparatus of the first system in response to the supporting state identifier stored in the storage unit, when the electronic power supply of the mobile terminal is turned ON, and thereby the location registration process is executed while being turned into the state of supporting the second system.

8. The mobile terminal according to claim 1, wherein the location registration failure signal indicates that the location registration to the second location registered area is ended in failure because there is no suitable second cell in the second location registered area.

9. The mobile terminal according to claim 1, wherein
the second system provides communications service different from communications service provided by the first system,
the mobile terminal includes a function in which communication is available in any one of the first system and the second system, and
the connection setting processor:

transmits the connection request signal including the supported identifier as a first connection request signal to the first wireless access apparatus, receives an instruction to redirect from the first cell to the second cell, from the first wireless access apparatus in response to the first connection request signal, transmits, in response to the instruction, a location registration request signal to a second wireless access apparatus of the second system, receives the location registration failure signal from the second wireless access apparatus in response to the location registration request signal, transmits, in response to the location registration failure signal, the connection request signal not including the supported identifier as a second connection request signal to the first wireless access apparatus, and requests the first wireless access apparatus to perform location registration of the mobile terminal after transmitting the connection setting completion signal.

10. A mobile communication method, wherein a mobile terminal is instructed to be redirected from a first cell to a second cell by a first wireless access apparatus, in an overlapped area between the first cell in which communication with a first system is available and the second cell in which communication with a second system is available, by transmitting a connection request signal including a supported identifier for indicating that the second system is supported from the mobile terminal to the first wireless access apparatus of the first system, the mobile communication method comprising:

transmitting a connection request signal not including the supported identifier to the first wireless access apparatus when receiving a location registration failure signal for indicating that location registration to the second location registered area of the second system is ended in failure; and transmitting a connection setting completion signal including a not-supported identifier which indicates not supporting the second system and a handover not-supported identifier which indicates not supporting a handover between systems from the first system to the second system to the first wireless access apparatus, after setting a connection with the first wireless access apparatus in response to the connection setting signal received from the first wireless access apparatus, so as to execute a connection setting process with the first wireless access apparatus while being turned into a state of not supporting the second system.

* * * * *